(12) United States Patent
Chadha et al.

(10) Patent No.: US 6,850,906 B1
(45) Date of Patent: Feb. 1, 2005

(54) REAL-TIME FINANCIAL SEARCH ENGINE AND METHOD

(75) Inventors: Tejpal Singh Chadha, San Jose, CA (US); Kenneth Allen Williams, San Jose, CA (US); Nagaraju Pappu, Bangalore (IN)

(73) Assignee: Traderbot, Inc., Los Gatos, CA (US)

( * ) Notice: Subject to any disclaimer, the term of this patent is extended or adjusted under 35 U.S.C. 154(b) by 0 days.

(21) Appl. No.: 09/464,333

(22) Filed: Dec. 15, 1999

(51) Int. Cl.[7] ............................................. G06F 17/60
(52) U.S. Cl. ............................ 705/35; 705/37; 705/36; 707/3
(58) Field of Search ................................ 345/440, 419; 382/233; 705/1, 35, 36, 37; 707/9, 3

(56) References Cited

U.S. PATENT DOCUMENTS

| | | | |
|---|---|---|---|
| 4,868,866 A | * | 9/1989 | Williams, Jr. .................. 707/9 |
| 5,038,284 A | * | 8/1991 | Kramer ....................... 705/37 |
| 5,706,442 A | | 1/1998 | Anderson et al. |
| 5,745,881 A | * | 4/1998 | Tada et al. .................... 705/10 |
| 5,884,305 A | | 3/1999 | Kleinberg et al. |
| 5,893,079 A | | 4/1999 | Cwenar |
| 5,895,471 A | | 4/1999 | King et al. |
| 5,924,090 A | | 7/1999 | Krellenstein |
| 5,926,822 A | | 7/1999 | Garman |
| 5,933,822 A | | 8/1999 | Braden-Harder et al. |
| 5,946,666 A | * | 8/1999 | Nevo et al. ................... 705/36 |
| 6,012,046 A | * | 1/2000 | Lupien et al. ................ 705/37 |
| 6,073,115 A | * | 6/2000 | Marshall ...................... 705/35 |
| 6,195,103 B1 | * | 2/2001 | Stewart ....................... 345/440 |

FOREIGN PATENT DOCUMENTS

| WO | WO 97/05575 | * | 2/1997 | ........... G06T/15/00 |
|---|---|---|---|---|

OTHER PUBLICATIONS www.hoovers.com (archive from Dec. 12, 1997).*
Datta, Anindya, and Viguier, I., Providing Real–Time Response, State Recency and Temporal Consistency in Databases for Rapidly Changing Environments

* cited by examiner

*Primary Examiner*—Hyung Sough
*Assistant Examiner*—Harish T Dass
(74) *Attorney, Agent, or Firm*—Thomas E. Schatzel; Law Offices of Thomas E. Schatzel A Prof. Corp.

(57) ABSTRACT

A real-time financial search engine retrieves financial updates in real-time. A condensation memory in the real-time financial search engine stores financial data in a compacted space that allows computation of a smaller set of numbers. Real-time feed is converted into a two-dimensional (X, Y) location code for placement on a linear location code array of a security symbol. A single number of a location code efficiently represents (time, price) or (time, volume) in a 2D coordinate plane for real-time search of financial data.

7 Claims, 8 Drawing Sheets

| | (0, 0) | (1, 0) | (2, 0) | (3, 0) | (4, 0) | (5, 0) | (6, 0) | (7, 0) |
|---|---|---|---|---|---|---|---|---|
| (0, 0) | | | | | | | | |
| (0, 1) | | 003 | | | | | | |
| (0, 2) | | 021 | 030 | 031 | | | | |
| (0, 3) | | 023 | 032 | 033 | 122 | | | |
| (0, 4) | | | 210 | 211 | 300 | 301 | 310 | 311 |
| (0, 5) | | | 212 | 213 | 302 | 303 | 312 | 313 |
| (0, 6) | | | | | 320 | 321 | 330 | 331 |
| (0, 7) | | | | | 322 | 323 | 332 | 333 |

*FIGURE 8*

REAL-TIME FINANCIAL SEARCH ENGINE AND METHOD

BACKGROUND INFORMATION

1. Field of the Invention

The invention relates to the field of search engines, and particularly to a real-time search engine of financial information.

2. Description of Related Art

Access to financial information has become increasingly time-critical as various technologies mature. Satellites, high-speed computers, wireless devices, and the Internet paved the way for financial world to connect seamlessly through landlines or via wireless transmissions. The inevitable scrutiny, sophistication, and attention in processing and analyzing financial information are evident as expected methods of doing business inventions increase dramatically in the years ahead.

Existing tools in searching financial information analyze delayed or historical data. A user submits a query containing one or more security symbols with a search criterion to obtain stock quotes and news. For example, institutional bankers and individual investors in trading systems analyze performance of securities by defining queries to obtain a set of financial data, such as a list of ten leading percentage gainers or a security that surpasses a 200 day moving average. However, the queries in these search results produce, at best, delays in several minutes. The main obstacle is the large storage capacity required to store all the exchange updates, which is about 4 million updates a day. With each update requiring 100 bytes of storage space, a substantial search time is necessary to search through 400 Mbytes of storage space for the 4 million updates. In an ever-fast moving financial market, such delays can translate to miss opportunities or significant economic losses.

Accordingly, it is desirable to have a real-time search engine of financial information for generating real-time financial analysis to institutional or individual investors.

SUMMARY OF THE INVENTION

The invention provides a real-time financial search engine in retrieving financial information in real time. A condensation memory in the real-time financial search engine stores financial data in compacted space that allows computation of a reduced set of numbers. Real-time feed is converted into a two-dimensional location code to construct or update a linear location code array for a security symbol. A single number of a location code efficiently represents (time, price) or (time, volume) in a 2D coordinate plane for real-time access to financial information. The combination of storing real-time feed of a symbol in a linear location code structure within a fast-access memory yields real-time search results.

Advantageously, the representation of a security symbol in a linear location code array in a condensation memory provides a search engine the capability to efficiently compute financial information in real time. The result produces a sub-second response time in providing real-time financial data to institutional or individual investors.

DETAILED DESCRIPTION OF PREFERRED EMBODIMENT

Figure 1:
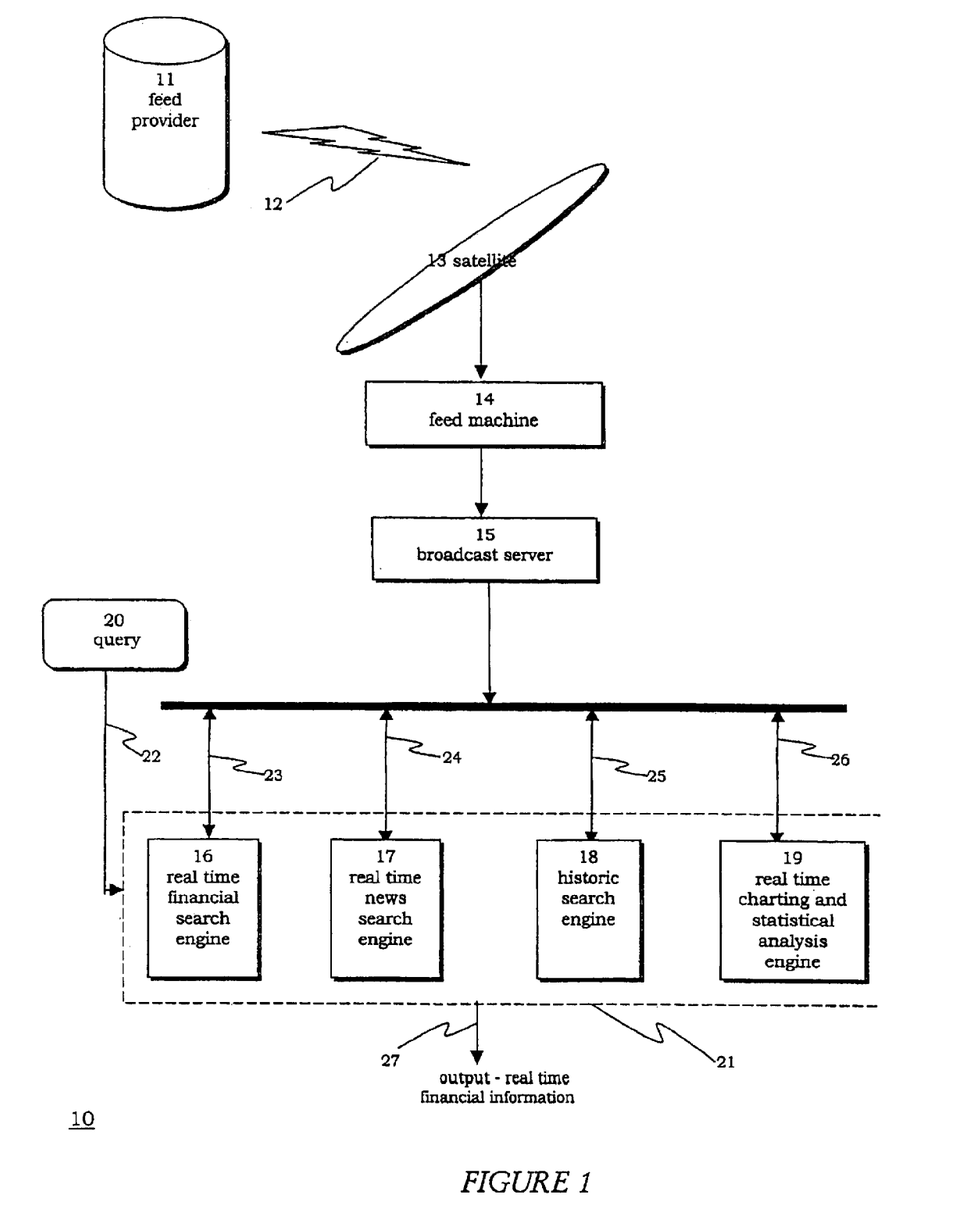
FIG. 1 is an architectural diagram illustrating a real-time financial search system in accordance with the present invention.

FIG. 1 is an architectural diagram of a real-time financial search system 10 for searching financial information in real time. Real-time financial search system 10 includes a feed provider 11, a feed 12, a satellite dish 13, a feed machine 14, a broadcast server 15, a real-time financial search engine 16, a real-time news search engine 17, a historic search engine 18, a real-time charting and statistical analysis engine 19, and a query 20. A feed provider 11 transmits feed 12 via satellite dish 13 to feed machine 14. Feed 12 includes various types of financial information, e.g., real-time stock quotes, real-time intraday updates, and real-time news updates. Feed machine 14 sends feed 12 to broadcast server 15 for broadcasting information to real-time financial search engine 16, real-time news search engine 17, historical search engine 18, and real-time charting and statistical analysis engine 19. A user submits a query 20 via a line 22 specifying parameters in searching through real-time financial search engine 16 to generate an output 27 of real-time financial information. Optionally, a user may specify query 20 for searching through a composite search engine 21 including a combination of real-time search engine 16, real-time news search engine 17, historical search engine 18, and real-time charting and statistical analysis engine 19.

Broadcast server 15 receives feed 12 in real-time from feed machine 14. Feed 12 includes information in proprietary formats as specified by feed provider 11, such as ASCII and binary formats. Broadcast server 15 parses and distributes feed 12 via a line 23 to real-time financial search engine 16, via a line 24 to real-time news search engine 17, via a line 25 to historical search engine 18, or via a line 26 to real-time charting and statistical analysis engine 19. For example, if feed 12 receives intraday price updates, broadcast server 15 routes feed 12 via line 23 to real-time financial search engine 16. If feed 12 received is news updates, broadcast server 15 routes feed 12 via line 24 to real-time news search engine 17.

Query 20 is a user-defined parameter setting forth the criteria for conducting a search. For example, query 20 specifies to real-time financial search engine 16 to search for "a list of the top 50 companies at the present time that are most active in volume, with P/E ratio less than 15, and that have been trading up for the last 20 trades." Another example, query 20 specifies to real-time financial search engine 16 to search for "a list of 20 companies that have buyout offers but are trading at 25% less than the buyout offer." A further example, query 20 specifies to real-time financial search engine 16 to search for "a list of 20 companies whose share price >=10 AND price <=20 AND volume >=500,000 AND (price[50]–price [100])>0.75."
This query searches for all stocks, since the opening of trading to the present time, that are trading between 10 and 20 dollars per share with a volume of over 500,000 shares for the day. The expression of price[50] denotes that the average price for the last 50 ticks, while the expression of price [100] denotes the average price for the last 100 ticks. A tick requires n seconds of processing time. A trader may find this query to be useful in locating a stock that is attractive enough to day trade in blocks of 1000 shares which produces reasonable volumes with an upward progress in the last 50 ticks.

Furthermore, query 20 specifies to real-time financial search engine 16 to searching for "volume [600]>volume [12:30:06–13:30:59] AND price[600]>price (12:30:06–13:30:5] AND NEWS[600]". This query searches for all stocks where the total volume for the last 600 ticks is greater than the volume from the time 12:30:06 through 13:30:59, with the average price of the last 600 ticks greater than the average price from the time 12:30:06 through 13:30:59, and with news received in the last 600 ticks. If a tick is set at 6 seconds per tick, then 600 ticks equate to 1 hour.

Optionally, real-time financial search system 10 is equipped with other search capabilities including real-time news search engine 17, historical search engine 18, and real-time charting and statistical analysis engine 19. Real-time news search engine 17 provides capabilities to retrieve real-time news articles and news updates. Historical search engine 18 permits archival service on intra-day dates. Real-time charting and statistical analysis engine 19 provides real-time charting and financial analysis, customization, and portfolio/symbol watching.

Figure 2:
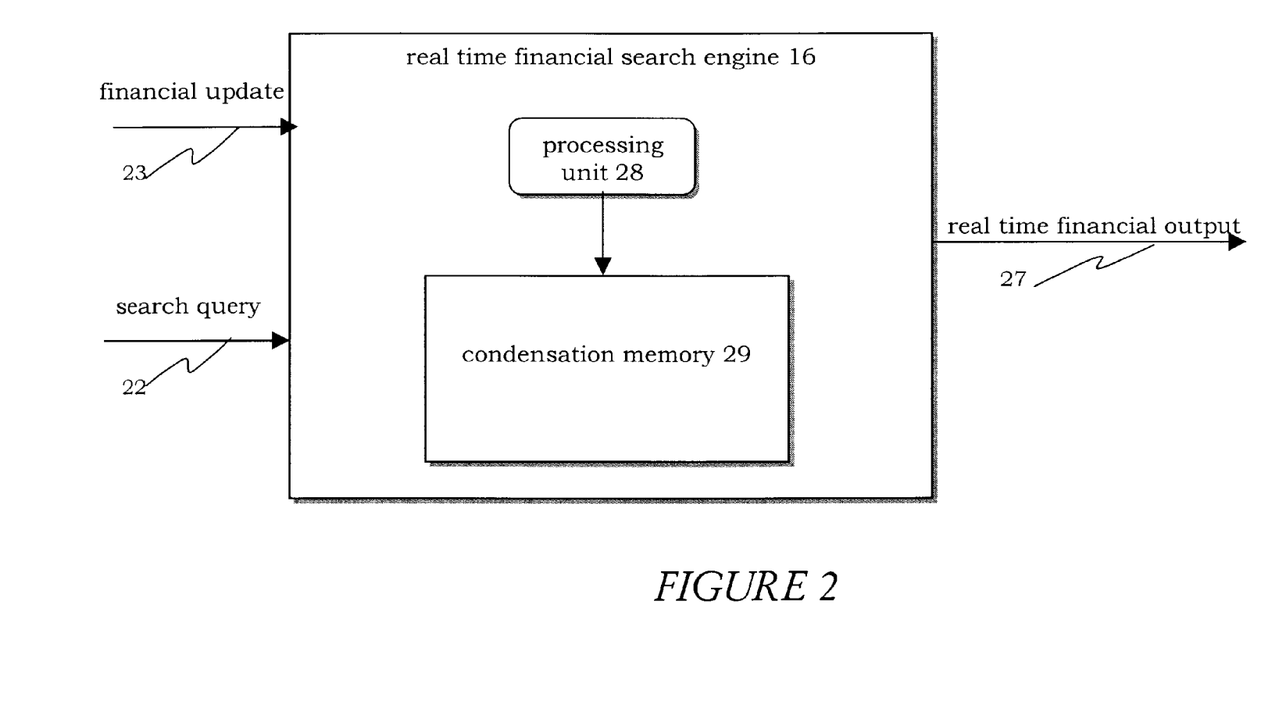
FIG. 2 is a block diagram illustrating a real-time financial search engine in accordance with the present invention.

FIG. 2 is a block diagram of real-time financial search engine 16, including a processing unit 28 and a condensation memory 29. Real-time financial search engine 16 receives inputs of financial or exchange update via line 23 and search query through line 22. Processing unit 28 processes search query 20 in condensation memory 29 at a sub-second rate to generate real-time financial output via line 27.

Condensation memory 29 stores time, price, and volume of a stock update in a 3-dimensional (3D) structure. A 3D (p, v, t) structure of a stock is represented as ordered pairs (X, Y) or (X, Z) on a 2-dimensional (2D) coordinate system, with X denoting time, Y denoting price, and Z denoting volume. Each exchange update received by the real-time financial search engine 16 is converted into a unique (S Y) coordinate or a unique (X, Z) coordinate. Each (X, Y), (X, Z), or other combinations of 2-D coordinate is then converted to a unique location code, which consumes four bytes of memory storage spa in condensation memory 29. The term "condensation memory" 29 uses one number, i.e., a location code, in representing a pair of (X, Y) coordinates on a linear array. The (X, Y) coordinate represents a pair of (time, price), (time, volume) or other combinations thereof.

Condensation memory 29 is an in-memory data store of security symbols of exchange updates. For an array size $2^{16} \times 2^{16}$, 4 GB updates can be uniquely stored. Each location code stores four bytes of memory space. Even if no condensation is possible, a maximum of 4 bytes is required to store each exchange update. To store 4 Megabytes exchange updates without condensation, 8 MB is required for price and 8 MB is required for volume. As a result, 16 MB are necessary to store price and volume updates for all security symbols in one day, which is approximately 20 times or more reduction in memory capacity.

In this embodiment, the historical database has 26 fields. Each field is either a long number or a floating-point number. Each field occupies four bytes of memory space for storage. Each symbol name is allotted 20 characters. For a total of 16 k symbols, the main memory storage space in condensation memory 29 is computed as: $(20+26*4)* 16*1024+16$ MB=18 MB of main memory storage.

Optionally, fields in historical database can be stored as inverted indexes. An inverted index is a value to key mapping. The inverted index on P/E ratio has a list of symbols for every value of the field. The inverted index of P/E appears as:

P/E Ratio of 10→a list of symbols (index of an array)
P/E Ratio of 10→a list of symbols Query 20 is first parsed to find an intersection of symbols from the inverted indexes. For this list of symbols, real-time financial search engine 16 accesses linear location code array for fast computations. For example, a query is received to "obtain price between 10 and 20, volume>50000 and price[50]–price [100]>0.5 and P/E ratio>20". First, a list: of symbols is found with the inverted index on P/E ratio of 20. Second, a list of symbols is retrieved with the inverted index on Price between 10 and 20 dollars. Third, a list of symbols is found with the inverted index on Volume. Real-time financial search engine 16 computes an intersection of the symbols. For each symbol, real-time financial search engine 16 accesses linear location code arrays for (Price, Time) and computes average price during the last 50 ticks and during the last 100 ticks. Finally, real-time financial search engine 16 returns a list of symbols that matches with query 20.

An inverted index can be stored as an array or as a hashing function. The inverted index needs to store just the index of the array for a symbol. For example, if the index of the array for INTC (security symbol for Intel™) is 10256 and the P/E ratio of INTC is 20, then the inverted index of P/E ratio has an entry as follows: 20→10256.

Figure 3:
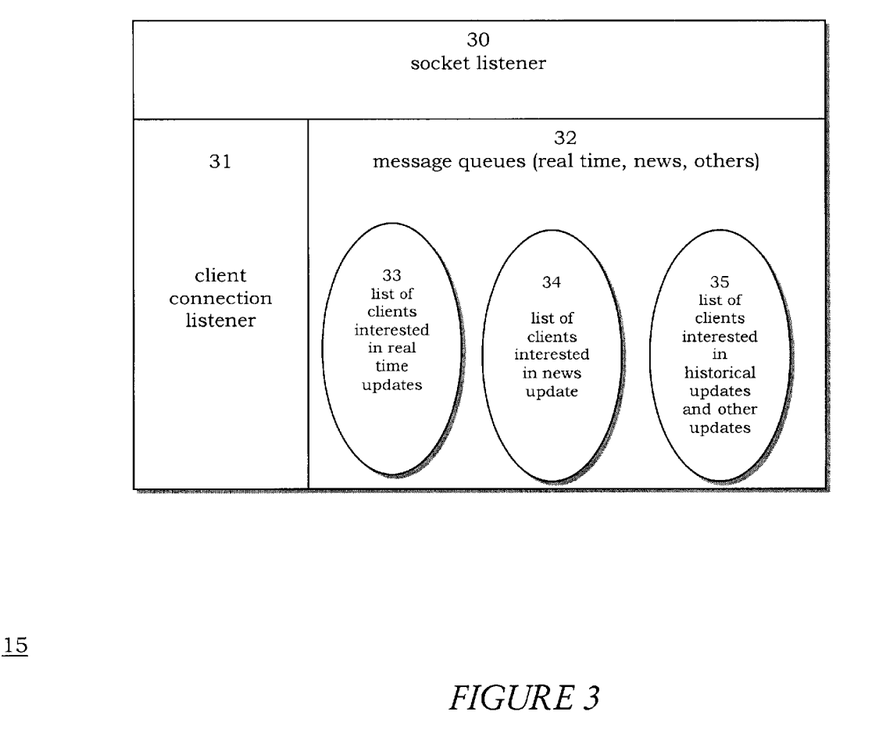
FIG. 3 is block diagram illustrating a broadcast server in accordance with the present invention.

A datastructure of an in-memory database can be divided to a security symbol and a location code array. The symbol pertains to the current information about the symbol, and two linear location code arrays for (price, time) and (volume, time). The current information includes:

Symbol Name
Opening Price—opening price of the stock for that day
Opening Time—the time in which the first update occurs for that symbol
Opening Volume—total volume which came with the first update
Current Price—current price of the stock
Current Time—the time at which the last update occurred
Current Volume—total volume associated with the last update
PriceTimeLocationCode—Location Code Array holds price, time, and information updates
VolumeTimeLocationCode Array—Location Code Array holds volume and time information updates
A Location Code Array includes the following fields:
Size of the Universe Plane
Price Origin—opening price
Volume Origin—opening volume
Time Origin—opening time
Price Unit—unit on the price axis
Volume Unit—unit on the volume axis
Time Unit—unit on the time axis
LocationCodesArray—holds all location codes
Number of Points—equals to the number of records FIG. 3 is a block diagram of broadcast server 15. Broadcast server 15 has a socket listener 30 for detecting client connect signals via a client connection listener 31. The term "client" as used is synonymously with "search engine". Each time a client or search engine connects, the client announces patterns of data that the client is interested in receiving from broadcast server 15. For example, when real time search engine 16 connects with broadcast server 15, the submitted query 20 indicates to broadcast server 15 concerning parameters that real-time search engine 16 wishes to receive.

Broadcast server 15 creates message queues 32 for each different pattern of data, real-time updates, real-time news, or historic news. A message queue 33 stores a list of clients who are interested in obtaining real-time updates. A message queue 34 stores a list of clients who are interested in obtaining new updates. A message queue 35 stores a list of clients who are interested in obtaining historical updates and other types of financial updates.

Figure 4:
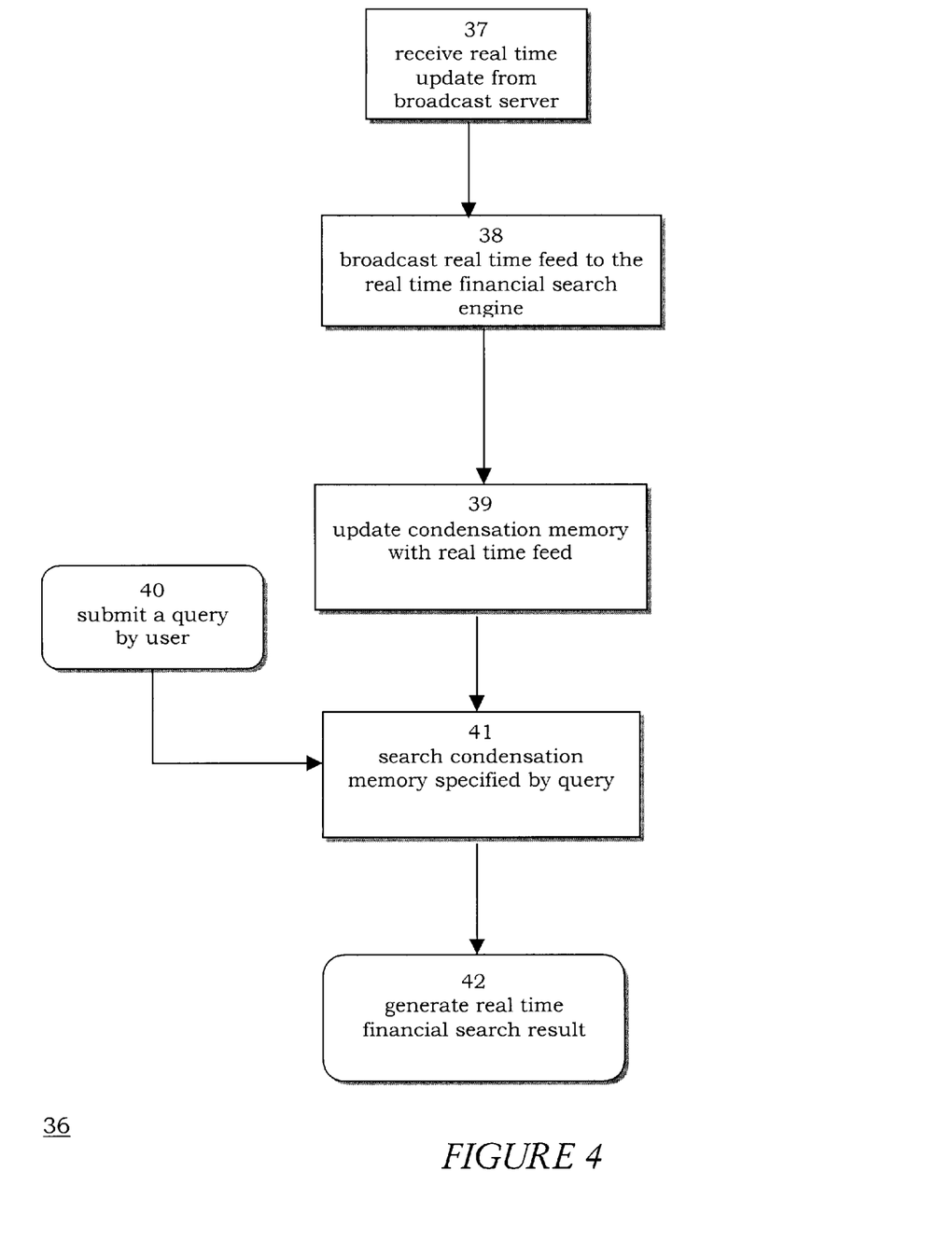
FIG. 4 is a flow chart illustrating the process of a real-time financial search engine in accordance with the present invention.

FIG. 4 is a flow chart of a real-time financial search method 36. Broadcast server 15 receives 37 real-time feed 12 from feed machine 14. Broadcast server 15 in turn broadcasts 38 real-time feed 12 to real-time financial search engine 16, which updates 39 condensation memory 29 with feed 12. A user submits 40 a query setting forth parameters for conducting a search. Real-time financial search engine 16 searches 41 in condensation memory 29 with parameters as specified by query 40. The search results in real-time financial search engine 16 generating 42 real-time financial information to an institutional or individual investor.

Figure 5:
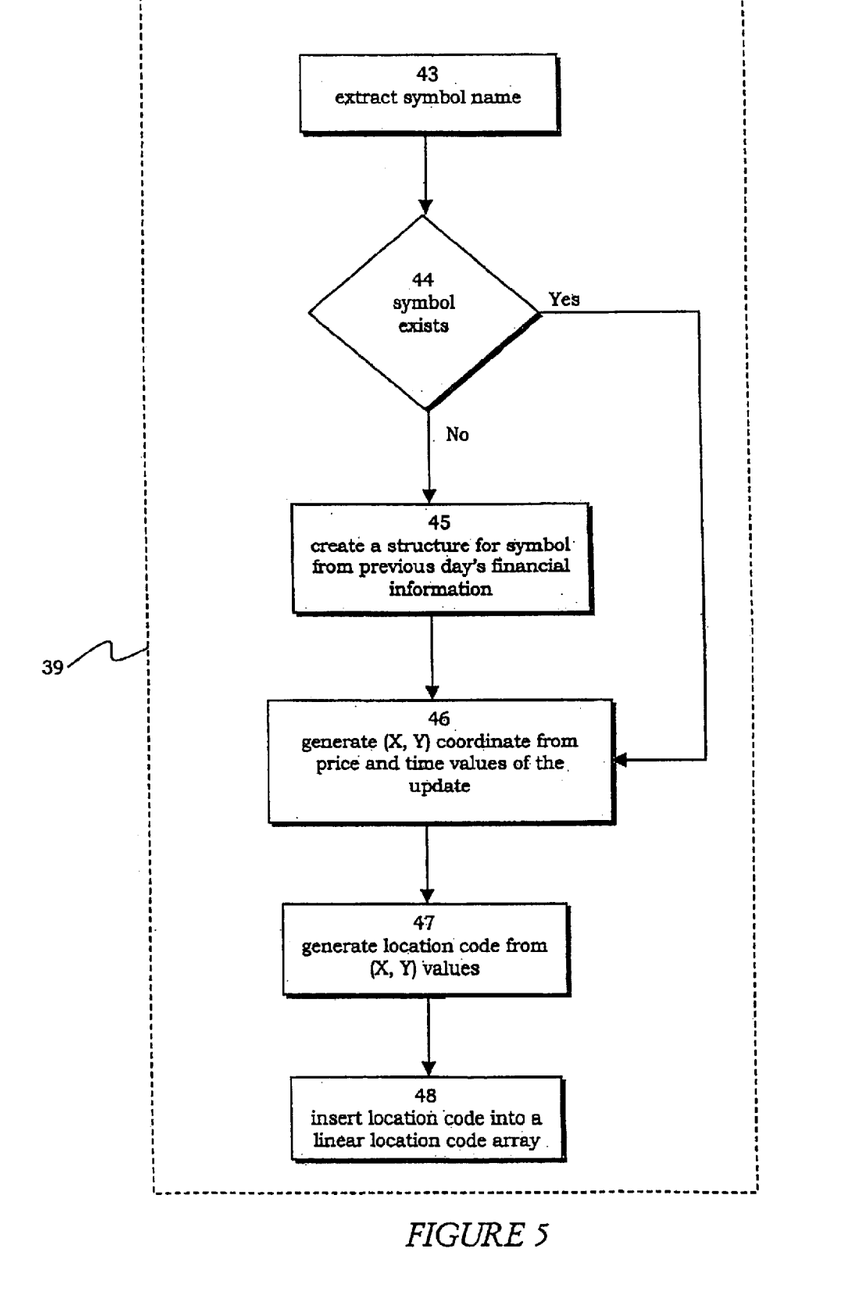
FIG. 5 is a flow chart illustrating the process of a feed update method in accordance with the present invention.

FIG. 5 is a feed update method 39 in processing exchange updates in condensation memory 29. Real-time financial search engine 16 extracts 43 a symbol name from feed 12 received from broadcast server 15. If feed 12 matches 44 with a symbol, real-time financial search engine 16 generates 36 a (X, Y) coordinate from price and time values in feed update 12. However, if the symbol does not exist, real-time financial search engine 16 creates 45 a structure for the symbol based on the financial information from the previous day. The structure created is used to generate 46 (X, Y) coordinate from price and time values in feed update 12. The (X, Y) coordinate generated is used to generate 47 a location code for the symbol. After the location code is determined, real-time financial search engine 16 inserts 48 the location code in a linear location code array. An implementation of this operational process is illustrated in Appendix A.

Figure 6:
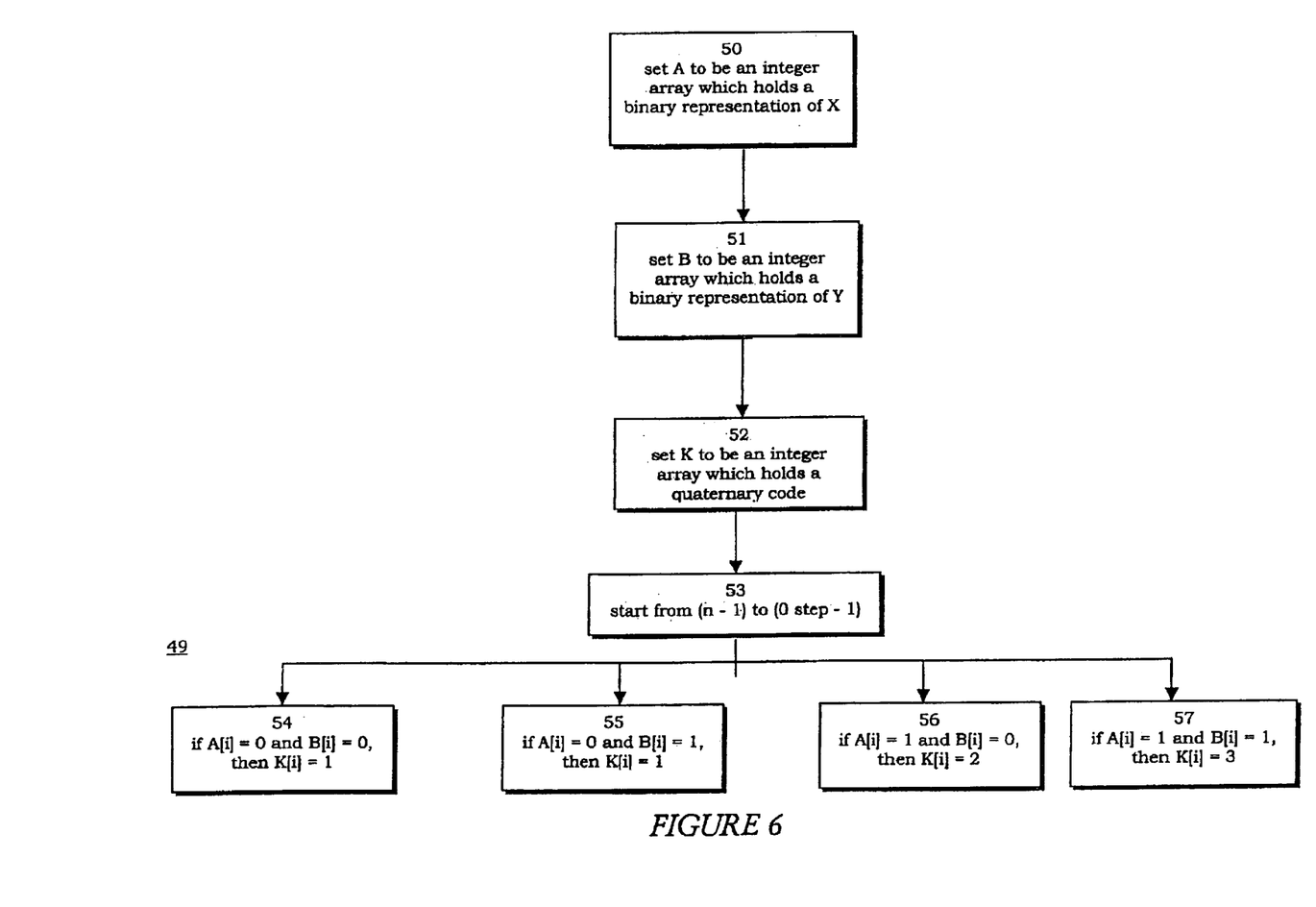
FIG. 6 is a flow chart illustrating the process of constructing a linear location code array in accordance with the present invention.

FIG. 6 is a flow chart of a linear location code array method 49 in constructing a linear array. Real-time financial search engine 16 sets 50 A to be an integer array which holds the binary representation of X, and sets 51 B to be an integer array which holds the binary representation of Y. Real-time financial search engine 16 sets 52 K to an array which holds a quaternary code. The process starts 53 from n−1 to 0 Step−1. If both A[i] and B[i] equal to 0 in operation 54, then K[i] is set to 0. If A[i]=0 and B[i]=1 in operation 55, then K[i] is set to 1. If A[i]=1 and B[i]=0 in operation 56, then K[i} is set to 2. If both A[i] and B[i] equal to 0 in operation 57, then K[i] is set to 3.

Figure 7A:
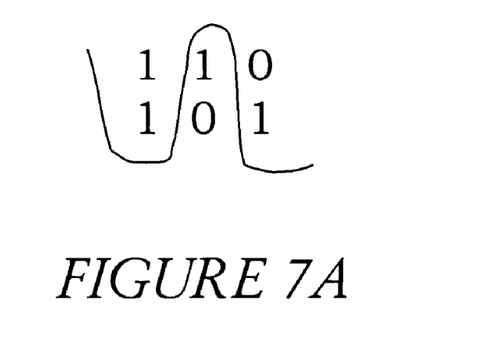
FIGS. 7A–7B are diagrams illustrating the computation of a linear code in accordance with the present invention.
Figure 7B:
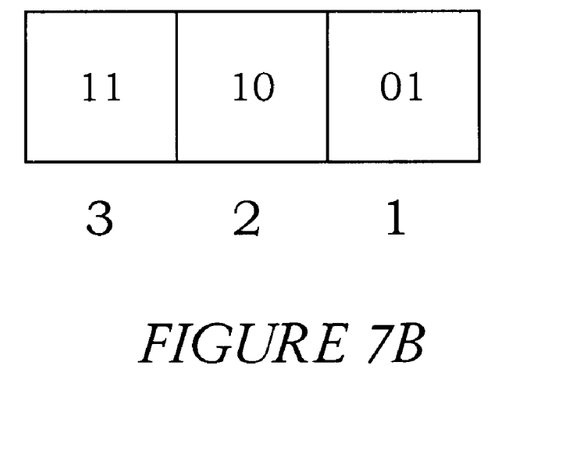

An example in the computation of a linear code is shown in FIGS. 7A–7B. Real-time financial search engine 16 receives feed 12 with X=6 and Y=5, or a (6, 5) coordinate pair on a 2-D plane. The binary representation of X is "110" and the binary representation of Y is "101". In computing the location code for (6, 5), real-time financial search engine 16 starts from the most top-left column, the most bottom-left column, the next to-left column, the next bottom-left column, and continues until all binary digits have been considered. As shown in FIG. 7A, the left most column forms a binary combination of "11", the next left most column forms a binary combination of "10", and the right most column forms a binary combination of "01". The three combinations are concatenated as "11, 01, and 10". The location code of (6, 5) therefore has been computed as 321, as shown in FIG. 7B.

Figure 8:
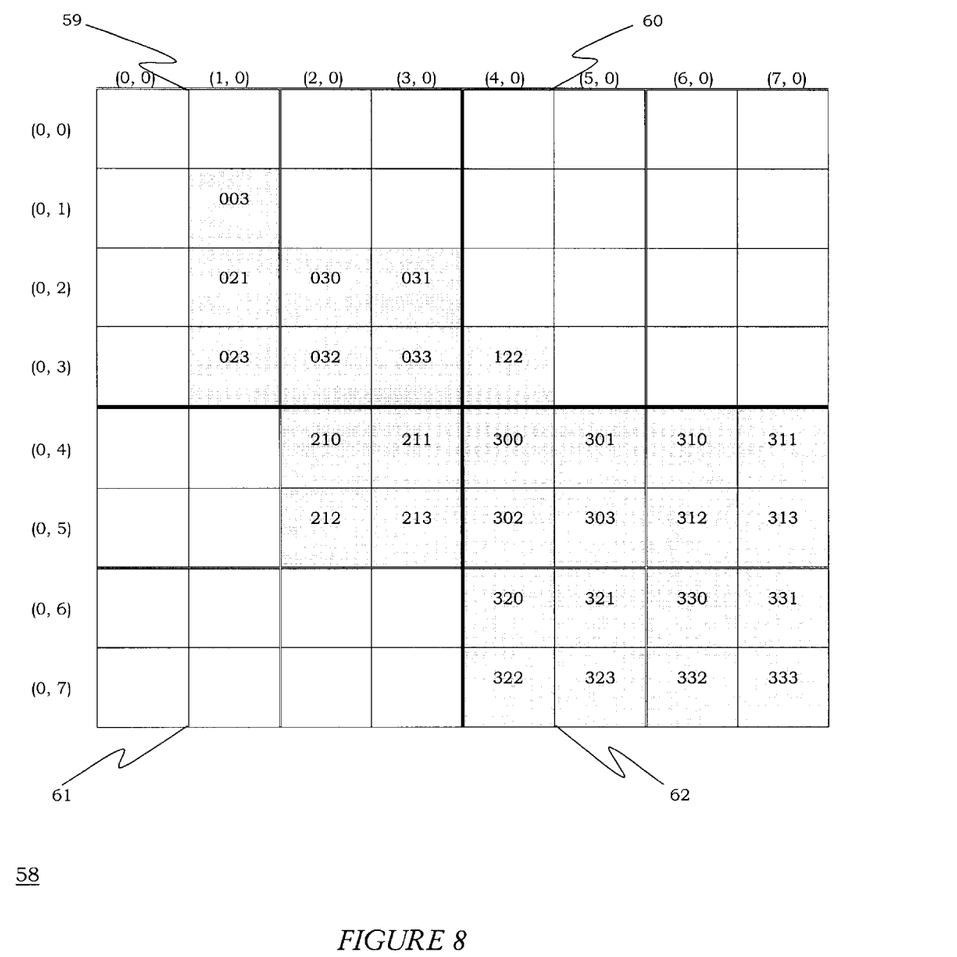
FIG. 8 is a linear location code array in storing location codes in a condensation memory in accordance with the present invention.

FIG. 8 is a linear location code array 58 in storing location codes in condensation memory 29. Linear location code array 58 has an array size of 8×8, or a total of 64 possible updates, where the X-axis represents time and the Y-axis represents price. Twenty-eight exchange updates are received in feed 12. Linear location code array 58 is divided into four quadrants, with a northwest (NW) quadtrant 59 given a location code 0, a northeast (NE) quadtrant 60 given a location 1, a southwest (SW) quadtrant 61 given a location 2, and a southeast (SE) quadtrant 62 given a location 3.

Linear location code array method 49 is used to compute twenty-eight location codes in table diagram 58. A linear array is constructed by converting each (X, Y) coordinate to a location code. Converting (X, Y) coordinates into location codes are simply bit-wise operations, which is a bit-by-bit interleaving of X and Y coordinate values. Results of location values for (X, Y) coordinate is as follows:

TABLE 1

| Coordinate | Linear Code | Binary X and Binary Y | Binary Linear Code |
|---|---|---|---|
| (1,1) | 003 | 001 and 001 | 00-00-11 |
| (1,2) | 021 | 001 and 010 | 00-10-01 |
| (1,3) | 023 | 001 and 011 | 00-10-11 |
| (2,2) | 030 | 010 and 010 | 00-11-00 |
| (2,3) | 032 | 010 and 011 | 00-11-10 |
| (3,2) | 031 | 011 and 010 | 00-11-01 |
| (3,3) | 033 | 011 and 011 | 00-11-11 |
| (4,3) | 122 | 100 and 011 | 01-10-10 |
| (2,4) | 210 | 010 and 100 | 10-01-00 |
| (3,4) | 211 | 011 and 100 | 10-01-01 |
| (4,4) | 300 | 100 and 100 | 11-00-00 |
| (5,4) | 301 | 101 and 100 | 11-00-01 |
| (6,4) | 310 | 110 and 100 | 11-01-00 |
| (7,4) | 311 | 111 and 100 | 11-01-01 |
| (2,5) | 212 | 010 and 101 | 10-01-10 |
| (3,5) | 213 | 011 and 101 | 10-01-11 |
| (4,5) | 302 | 100 and 101 | 11-00-10 |
| (5,5) | 303 | 101 and 101 | 11-00-11 |
| (6,5) | 312 | 110 and 101 | 11-01-10 |
| (7,5) | 313 | 111 and 101 | 11-01-11 |
| (4,6) | 320 | 100 and 110 | 11-10-00 |
| (5,6) | 321 | 101 and 110 | 11-10-01 |
| (6,6) | 330 | 110 and 110 | 11-11-00 |
| (7,6) | 331 | 111 and 110 | 11-11-01 |
| (4,7) | 322 | 100 and 111 | 11-10-10 |
| (5,7) | 323 | 101 and 111 | 11-10-11 |
| (6,7) | 332 | 110 and 111 | 11-11-10 |
| (7,7) | 333 | 111 and 111 | 11-11-11 |

The following example shows the application of linear location code array method 49 to a stock update. The top-left corner serves as an origin, with the horizontal axis representing time and the vertical axis representing price. Each unit on the horizontal axis is in a 10-minute time increment, while each unit on the vertical axis is in a $0.50 price increment. If the origin (0, 0) is defined as (5:45:00, $10), then the twenty-eight updates are as follows:

TABLE 2

|  | Time | Price |
|---|---|---|
| Update 1 | 5:55 | 10.50 |
| Update 2 |  | 11.00 |
| Update 3 |  | 11.50 |
| Update 4 | 6:05 | 11.00 |
| Update 5 |  | 11.50 |
| Update 6 |  | 12.00 |
| Update 7 |  | 12.50 |
| Update 8 | 6:15 | 11.00 |
| Update 9 |  | 11.50 |
| Update 10 |  | 12.00 |
| Update 11 |  | 12.50 |
| Update 12 | 6:25 | 11.50 |
| Update 13 |  | 12.00 |
| Update 14 |  | 12.50 |
| Update 15 |  | 13:00 |
| Update 16 |  | 13:50 |
| Update 17 | 6:35 | 12:00 |
| Update 18 |  | 12:50 |
| Update 19 |  | 13:00 |
| Update 20 |  | 13:50 |
| Update 21 | 6:45 | 12:00 |
| Update 22 |  | 12:50 |
| Update 23 |  | 13:00 |
| Update 24 |  | 13:50 |
| Update 25 | 6:55 | 12:00 |
| Update 26 |  | 12:50 |
| Update 27 |  | 13:00 |
| Update 28 |  | 13:50 |

Query 20 relates time with changing parameters like price and volume. Condensation memory 29 stores exchange updates in feed 12 so that the price/volume that are based on a time parameter can be retrieved quickly. Queries 20 are based on time values on the X-axis, Real-time financial search engine 16 can quickly search through a linear location code array by conducting a binary search on a Y or vertical coordinate.

In one embodiment, real-time financial search engine 16 tracks real-time quotes and news to find symbols or companies that match certain trading patterns. Real-time financial search engine 16 monitors news, quotes, and fundamentals of all equities traded in the U.S. markets, including NASDAQ, the New York stock exchange, and the American stock exchange. A desirable feature is the capability to efficiently finding the price/volume of a stock at a given time. Additionally, a data structure is designed to aggregate prices between a time interval quickly.

The above embodiments are only illustrative of the principles of this invention and are not intended to limit the invention to the particular embodiments described. For example, one skilled in the art should recognize real-time data includes rapidly changing information, such as for airline traffic control, options trading, commodities trading, currency trading, or related types of activities. Moreover, it is apparent to one skilled in the art that the condensation memory can be implemented in various types of random access memory (ram), DRAM, SRAM, or similar memory types with fast memory access time. Accordingly, various modifications, adaptations, and combinations of various features of the described embodiments can be practiced without departing from the scope of the invention as set forth in the appended claims.

APPENDIX A
Unpublished ® 1999, TraderBot Inc.

```
//------------------------------------------------------------
                    CREATE A SYMBOL STRUCTURE
//------------------------------------------------------------
1.  Receive exchange update
2.  If a symbol does not exist, create a structure from previous day's
    statistics.
3.  GetStatisticsnConstructLinearArray (This function gets the price,
    time, volume Statistics for a particular symbol computed from
    the previous day's of data)
    3.1 InsertStatisticsintoPriceTimeLinearArray(price, timeinseconds)
        3.11 GenerateXYCoordinates(price,time)
        3.12 GenerateLocationCode(x,y)
    3.2 InsertStatisticsintoVolumeTimeLinearArray(volume,
    timeinseconds)
        3.2.1 GenerateXYCoordinates(volume,time)
        3.2.2 GenerateLocationCode(x,y)
4   UpdateLocationCodesArray(locationcode)
    Check whether the update occurred after a minute from the last
    update. If so Insert the constant delimiter 444 to location
    codes array. Store the index in the Minutes Array
5   UpdateLocationCodesArray(locationcode)
    Check whether the update occurred after a minute from the last
    update. If so, insert the constant delimiter 444 to location codes
    array. Store the index in the Minutes Array
```

We claim:

1. A real-time financial system, comprising:
   a feed machine for receiving one or more real-time financial updates of at least one symbol; and
   a real-time financial search engine, coupled to the feed machine to receive said updates and for real-time searching of the one or more real-time financial updates of the at least one symbol, the search engine including a condensation memory converting the real-time financial updates into a two-dimensional location code to construct a linear location code array, each linear location code in the linear location code array representing a pair of (X, Y) coordinates or a pair of (X, Y) coordinates, the X symbol denoting time, the Y symbol denoting price, and the Z symbol denoting volume.

2. The real-time financial search system of claim 1 wherein the condensation memory searches for the at least one symbol according to a search criteria.

3. The real-time financial search system of claim 1, further comprising a query device, coupled to the real-time financial search engine, for submitting searching parameters of the at least one symbol.

4. The real-time financial search system of claim 1, further comprising a broadcast server, coupled between the real-time financial search engine and the feed machine, for broadcasting real-time feed to the real-time financial search engine.

5. The real-time financial search system of claim 4, further comprising a real-time news search engine, coupled to the broadcast server, for searching real-time news related to the symbol.

6. The real-time financial search system of claim 4, further comprising a real-time charting and statistical analysis engine, coupled to the broadcast server, for searching real-time charting and statistics of the symbol.

7. The real-time financial search system of claim 1, further comprising a historic search engine, coupled to the broadcast server, for searching historical updates of the symbol.

* * * * *